Jan. 17, 1956 G. F. GREY 2,731,535
ELECTRODE FOR ATTACHING WELD NUTS
Filed Jan. 21, 1954 2 Sheets-Sheet 1

INVENTOR.
GREGORY F. GREY
BY Bosworth, Sessions, Herrstrom & Williams
ATTORNEYS

Jan. 17, 1956 G. F. GREY 2,731,535
ELECTRODE FOR ATTACHING WELD NUTS
Filed Jan. 21, 1954 2 Sheets-Sheet 2

INVENTOR.
GREGORY F. GREY
BY
Bosworth, Sessions, Herrstrom & Williams
ATTORNEYS

United States Patent Office 2,731,535
Patented Jan. 17, 1956

2,731,535

ELECTRODE FOR ATTACHING WELD NUTS

Gregory F. Grey, Berea, Ohio, assignor to The Ohio Nut & Bolt Company, Berea, Ohio, a corporation of Ohio Application January 21, 1954, Serial No. 405,476

14 Claims. (Cl. 219—4)

This invention relates to electrical welding and more particularly to an improved electrode for properly locating and welding so-called "weld nuts" or the like to a metal support to which the nut is to be attached.

The term "weld nut" as used herein refers to a metal body having an aperture therein (either threaded or unthreaded) and having welding projections extending from one face thereof. Weld nuts are made in a wide variety of forms and are attached to a support member (usually relatively thin sheet metal) by placing the weld nut thereon with the welding projections in contact therewith and then applying an electric current by electrodes one of which engages the outer face of the weld nut and the other of which engages the opposite side of the support member. When suitable current is passed between the electrodes the welding projections on the nut and the immediately adjacent metal of the supporting member are heated to welding temperature and pressure between the electrodes flattens out the welding projections and effects a weld which securely attaches the weld nut to the support.

In applying weld nuts of this type it is frequently desired to locate them with the hole or bore in the nut aligned with a hole in the support sheet. To accomplish this alignment and hold the nut in proper position relative to the hole in the sheet during the welding operation it has been proposed to use an electrode for making electrical contact with the sheet which has a pilot member extending from the contact face thereof, this pilot member having a portion projecting beyond the contact face of the electrode a distance substantially equal to the thickness of the supporting sheet and having a diameter just slightly smaller than that of the hole in the sheet with which the nut is to be aligned. Such pilot members also may have another portion projecting beyond the above described portion and of a diameter adapted to fit the aperture in the weld nut and thus locate the weld nut relative to the hole in the sheet during welding. In the past it has been necessary that such pilots be made of electrical insulating material such as fiber, ceramics, plastics or the like in order to prevent shunting of the welding current between the pilot and the edge of the hole in the supporting sheet, with resulting burning of the sheet around the hole or welding of the sheet to the pilot, as would occur if a metal pilot were used. When insulating pilot electrodes of this type are used they have relatively short life because the insulating material of which the pilot is made is relatively soft or brittle and quickly becomes worn or broken so that proper locating of the support member and nut is not obtained. Wear or breakage of such insulating pilots usually occurs around the edge of the pilot portion which locates the support member and is caused by locating the sheet member over, and removing it from, the pilot. Furthermore, when weld nuts of the type described, having welding projections located close to the hole in the support sheet, are welded in position the heat and pressure of the welding operation frequently cause inward distortion or flow of the metal of the support sheet at the edge of the hole with the resulting gripping of the pilot. When the sheet is then removed after the welding operation it must be pulled loose from the pilot with resulting wear or chipping of the edges thereof. Of course, when such a pilot becomes worn it must be replaced with resultant delay and expense.

It is an object of the present invention to provide a pilot type welding electrode for attaching weld nuts to supporting metal members wherein the pilot may be made of either metal or a non-conducting insulating material and which, if metal is employed, will eliminate and avoid any possibility of undesired burning or welding between the pilot and the edges of the hole in the supporting sheet, and, in the case of either metal or insulating material, will greatly reduce wear or breakage of the pilot member in use. Other objects of my invention include the provision of a pilot type welding electrode for weld nuts wherein the pilot member has long life, may readily be changed to accommodate different sizes of nuts and different thicknesses of support members, and which is economical to manufacture and maintain.

The above and other objects of my invention will appear from the following description of several embodiments thereof, reference being had to the appended drawings in which.

Figures 1, 2:
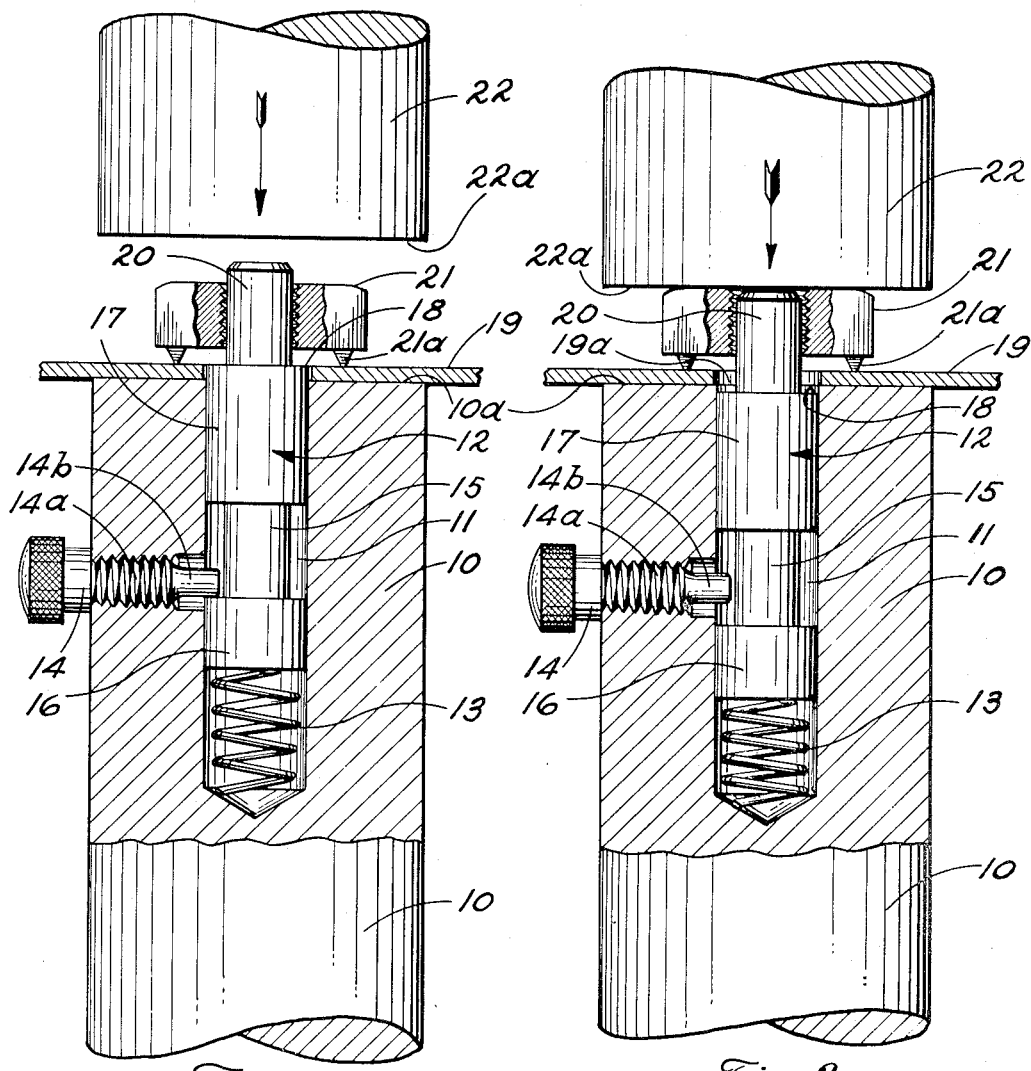
Figure 1 is a side elevation, partly in section, illustrating one form of my improved pilot type electrode in position relative to a hole in a supporting sheet and with a weld nut placed thereon, the other welding electrode being in its idle or preliminary position.
Figure 2 is a view similar to Figure 1 but illustrating the positions the parts assume when the upper electrode has been moved down into welding contact with the top face of the weld nut just prior to the application of welding current.
Figure 3:
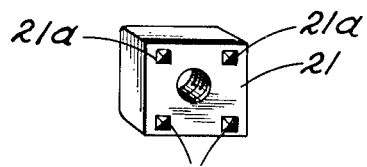
Figure 3 is a detached perspective view of the weld nut shown in Figures 1 and 2 which is one form of those with which the present invention is intended to be used.

Referring now to Figure 1, it will be understood that the lower electrode 10 and the upper electrode 22 are generally cylindrical members with opposed end contact faces 10a and 22a. These electrodes are preferably made of copper or other metal of suitable low electrical resistance and are mounted in the jaws of a resistance welding machine. Such machines are well known in the art and are adapted to supply welding current to the opposed electrodes and to permit the electrodes to be moved toward and away from each other to effect welding contact and pressure between the parts. In the present arrangement the lower electrode 10 is indicated as stationary while the upper electrode 22 is movable vertically toward and away from the lower electrode.

A pilot receiving central bore 11 extends downwardly from the contact face 10a of electrode 10 and the pilot member (generally indicated at 12 and made of steel or other suitable wear-resistant material) has a free sliding fit in the bore 11. The reduced diameter section 15 of the pilot 12 separates the base portion 16 thereof from the primary index portion 17. A stop pin 14 has a threaded shank portion 14a which engages a correspondingly threaded hole extending through the side of the electrode 10 and also has a reduced inner end portion 14b which extends into the bore 11 when the stop pin 14 is screwed into its operating position as seen in Figures 1 and 2.

The end 14b of pin 14 stops short of the reduced portion 15 of pilot 12 but is adapted to engage the upper end of the base portion 16 and limit outward movement of pilot 12 relative to electrode 10. As seen in Figure 1, a coil spring 13, disposed in the bottom of bore 11, urges the pilot 12 outwardly into engagement with the stop pin 14 which limits its outward movement and, as illustrated, locates the upper end face 18 of the primary index portion 17 of pilot 12 a distance above the contact face 10a of electrode 10 which is preferably not greater than the thickness of the metal support member 19 to which the weld nut 21 is to be attached. This distance of end face 18 above contact face 10a need be only great enough for proper indexing and holding the support member 19 in position and in the case of a relatively thick support member preferably would not be as great as the thickness thereof. In order properly to receive and position the hole 19a in the support member 19 the primary index portion 17 has a diameter slightly smaller than hole 19a. This relationship of the parts of electrode 10 and the member 19 is shown in Figure 1.

Projecting upwardly from the primary index portion 17 of pilot 12 is a secondary index portion 20 having a diameter smaller than that of primary index portion 17 and such that the aperture in the weld nut 21 may freely fit thereover and the nut be properly located relative to the hole 19a in the member 19. The secondary index portion 20 of pilot 12 is preferably coaxial with primary index portion 17 and its length is such that when a nut 21 is positioned thereon ready for welding, as seen in Figure 1, the upper end of index portion 20 is disposed a distance above the top face of the weld nut 21 slightly more than the distance of end face 18 above contact face 10a. The upper welding electrode 22 is preferably a cylindrical member either solid or bored for water cooling, and having a contact face 22a adapted to give proper contact with the upper surface of the nut 21 during the welding operation.

After the nut 21 has been placed on the secondary index portion 20 as seen in Figure 1 the welding projections 21a thereof rest upon the upper surface of the support member 19 and form the only contact between the welding nut and the member 19 as is seen in Figure 1. The upper electrode 22 is then lowered into the position seen in Figure 2 in which it has welding contact with its upper surface of the nut 21 and is applying the proper welding pressure thereagainst. During its downward movement from the position of Figure 1 into that of Figure 2 the contact face 22a of upper electrode 22 has engaged the upper end of the secondary index portion 20 of pilot 12 and has moved the entire pilot member 12 downwardly against the action of spring 13 into the position shown in Figure 2. This downward movement of the pilot 12 has caused the upper edge 18 of the primary index portion 17 of the pilot 12 to move down slightly into the bore 11 in lower electrode 10 and has thus moved pilot 12 completely out of any contact with the edges of the hole 19a in member 19 (see Figure 2). It will be observed that in order to move the end face 18 down into the bore in electrode 10 as seen in Figure 2, the secondary index portion 20 should project outwardly from the end face 18 of primary index portion 17 a distance greater than the overall thickness of the weld nut 21 (said overall thickness as used herein being the distance from the tips of the welding projections 21a to the top face of the nut).

In operation of the above described mechanism the welding current is applied to the electrodes 10 and 22 after the electrode 22 has depressed the pilot 12 into the position of Figure 2 and has applied proper welding pressure against the top of the nut 21. The welding current passes through the nut 21, the projections 21a thereof, and the support member 19. The projections are promptly heated to welding temperature and, under the continued pressure of the top electrode 22, they are flattened out and welded to the support member 19 with the bottom face of the nut substantially in contact therewith.

As there is no contact between the pilot 12 of the lower electrode and the edge of the hole 19a in the support member 19 there can be no flow of current therebetween and thus no possibility of burning or welding between the support member and the electrode pilot 12 when same is made of metal. Furthermore, even if the heat and pressure of the welding operation causes inward distortion of the hole 19a in the support sheet 19 there will be no gripping or squeezing on the primary index portion 17 of the pilot 12 as this portion is completely withdrawn from the hole 19a during the welding operation. When the upper electrode 22 is raised after the weld is completed the sheet 19 with the nut attached thereto may be freely lifted off over the pilot portion 20 and the entire pilot will resume its normal position (as seen in Figure 1) under the influence of spring 13. It will be seen from the above explanation that even if the pilot 12 is made of fiber, brittle ceramic material, or the like, there will be no wear or chipping of the pilot on removal of the work (as is frequently the case when fixed pilots are used) as there can be no gripping on the pilot due to inward distortion of the hole in the sheet 19 during welding. Thus, although particularly desirable to permit the use of metal pilot members, my invention also possesses definite advantages when non-conducting pilots are used.

If it is desired to use the electrode 10 with a different size weld nut or a different thickness supporting sheet it is only necessary to unscrew the stop pin 14 until the reduced end 14b thereof is withdrawn from the bore 11, remove pilot 12, and replace it with another pilot of proper size for the nut and support member to be welded.

Figure 4:
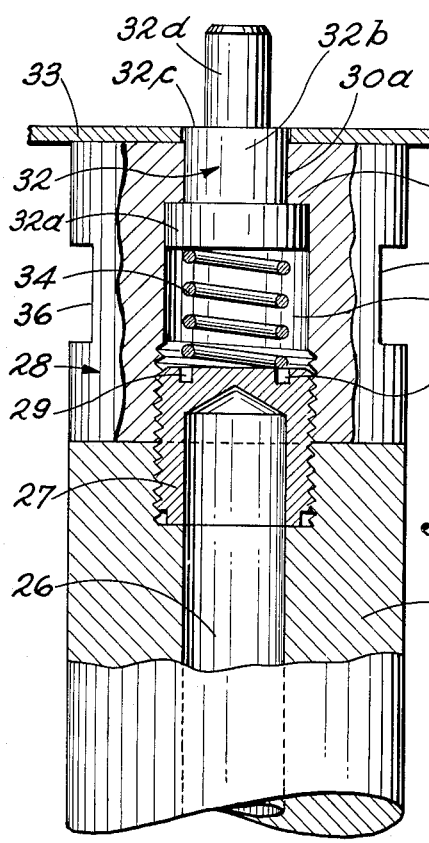
Figure 4 is a side elevation, partly in section, illustrating another embodiment of my invention in which the upper end of the pilot electrode may readily be changed to accommodate different jobs and which is particularly adapted for water cooling.

In Figure 4 I have illustrated a modified form of my invention in which the main electrode body 25 is provided with a bore 26 for water cooling purposes and a threaded coupling member 27, of inverted cup shape, is screwed into the outer end of the main body 25 to provide additional water cooling and permit ready attachment of the detachable end portion 28. The coupling member 27 may be provided with spaced holes 29 in its outer end face to accommodate a suitable tool for screwing the coupling firmly into position in the main body 25.

Extending through the detachable outer end portion 28 is a pilot receiving and guiding bore 30, of reduced diameter at its outer end as seen at 30a to form a shoulder or stop portion 31. Bore 30 is also threaded at its inner end to fit the threaded coupling member 27. The pilot member, which may be made either of metal or insulating material as described above, is generally indicated at 32 and comprises a guide portion 32a having a sliding fit in the large diameter portion of bore 30, a primary index portion 32b having an end face 32c and being adapted to fit the reduced diameter portion 30a of bore 30 and serve as an index guide for the hole in the support member 33, and a secondary index portion 32d of smaller diameter than primary index portion 32b.

The spring 34 is maintained in compression when the detachable end portion 28 is mounted on electrode body 25 as seen in Figure 4 and exerts outward pressure against the inner end of pilot 32 holding the upper face of body 32a thereof against the stop shoulder 31 which limits outward movement of the pilot member.

Opposed flats 35 and 36 may be provided on the outer surface of the cylindrical detachable portion 28 to accommodate a wrench and facilitate securing and removing same from the main body 25 of the electrode. The description above of the mode of operation of the device of Figures 1 and 2 is also applicable to the apparatus of Figure 4, the movable pilot 32 being depressed by the upper electrode to move the primary index portion 32b out of contact with the support member 33.

Figure 5:
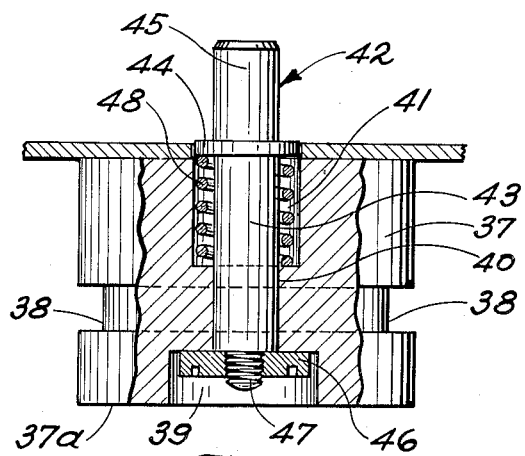
Figure 5 is a side elevation illustrating my invention as incorporated in a quick detachable electrode insert adapted to be used with a quick acting coupling so that setup time can be reduced in changing from one job to another.

Another modification of my invention is illustrated in Figure 5 in which a spring-backed pilot is mounted in a quick detachable electrode insert adapted to be used with a quick acting coupling (not shown) for securing the insert to a base unit (also not shown) so that the entire insert assembly may quickly and readily be changed when desired. The detachable insert consists of a cylindrical body member 37 having an annular groove 38 adapted to be engaged by the coupling member and provided with a bore extending axially therethrough. This bore includes an inner stop receiving portion 39, a guide portion 40 and a spring housing portion 41. The pilot, generally indicated at 42, includes a cylindrical body portion 43 of uniform diameter having a sliding fit in the guide portion 40 of the bore. At the upper end of body 43 is the primary index portion 44 of larger diameter than the body 43. The secondary index portion 45 extends outwardly beyond the primary index portion 44 in the same manner as in the previously described embodiments and a stop disk or flange 46 is secured to the lower end of body 43 as by threaded engagement with the projection 47. Other means for attaching the stop flange 46 may be employed and, after assembly of the unit, stop flange 46 remains in position until it is desired to replace the pilot.

To urge the pilot 42 outwardly at all times spring 48 is housed in the body 37 between the underside of primary index portion 44 of pilot 42 and the lower end of spring housing bore 41. As seen in Figure 5 the stop flange 46 fits freely within and engages the inner end of enlarged bore 39 to limit the outward movement of pilot 42 at the desired point while permitting inward movement thereof during the welding operation. The depth of bore 39 is preferably sufficient so that at no time during operation does any part of the pilot member 42 extend beyond the inner end face 37a of the body 37. As in the case of the embodiment shown in Figure 4 the mode of operation of the apparatus of Figure 5 is the same as that explained hereinabove in describing Figures 1 and 2.

Figure 6:
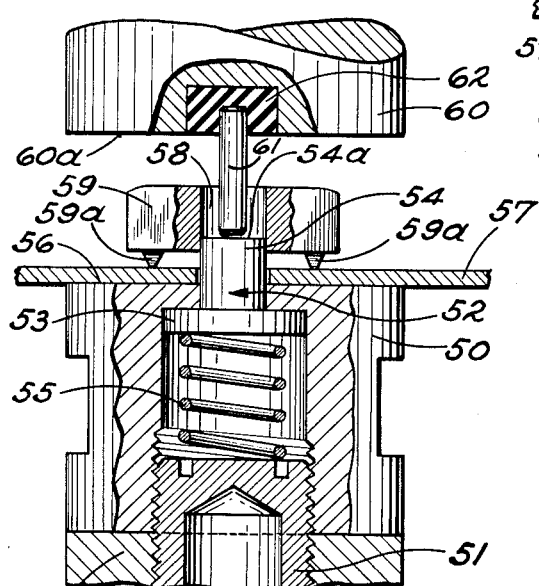
Figure 6 is a side elevation, partly in section, illustrating another modified form of my invention, some of the features of which are similar to those of Figure 4.
Figure 7:
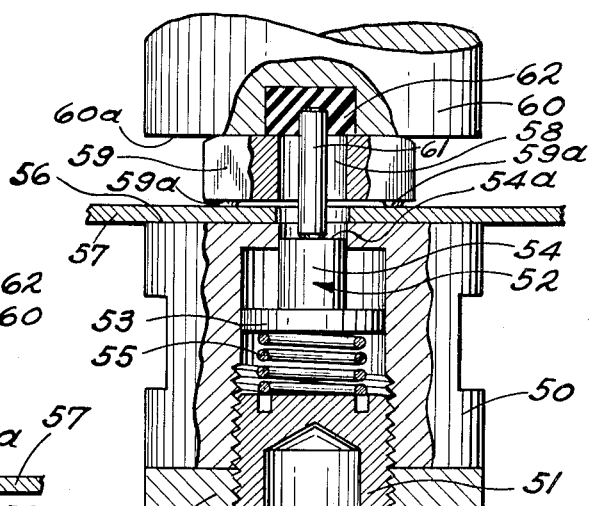
Figure 7 is a view like Figure 6 but illustrating the apparatus with the upper electrode in its lowest position and with the nut welded to the support member.

Figures 6 and 7 illustrate still another embodiment of my invention which is particularly adapted for use in locating and welding a weld nut having an unthreaded aperture of substantially the same diameter as the diameter of the hole in the support member. The electrode illustrated is of the threaded detachable end type shown in Figure 4 and includes a cylindrical body portion 50 adapted to have threaded attachment to a coupling member 51, which is of the type seen at 27 in Figure 4. The pilot, generally indicated at 52 has an enlarged stop portion 53 and a guiding and index portion 54. The spring 55 functions in the same manner as spring 34 of Figure 4 and maintains the upper end 54a of index portion 54 a distance above the upper end face 56 of the body 50 sufficient to project through the hole in the support member 57 and up into the hole 58 in the weld nut 59 when the weld nut is initially positioned prior to welding.

The upper electrode 60 is generally similar to upper electrode 22 of Figures 1 and 2 but is provided with a centrally located extension or projection in the form of a pin 61 extending downwardly from the bottom face 60a of upper electrode 60. This pin 61 is securely mounted in electrode 60 and may either be made of metal, as illustrated, and insulated from electrode 60 by a bushing member 62 of insulating material, or may be made of insulating material such as hard fiber or the like and mounted directly in the electrode 60.

In Figure 6 the parts are shown in the positions they assume after the support member and nut have been placed over the pilot 52 and the upper electrode 60 has been lowered until the end of pin 61 is just about to contact the end 54a of index portion 54 of the pilot. Further downward movement of electrode 60 will now cause pilot 52 to be depressed against the spring 55 and, when the bottom face 60a of upper electrode 60 engages the top of the nut 59, the end 54a of index portion 54 will have been moved downwardly completely out of the hole in the support member 57. The welding current is then applied and when the weld is completed the parts assume the positions of Figure 7 in which the welding projections 59a of nut 59 have been flattened out and welded to the support member 57.

As the pin 61 is of smaller diameter than the hole 58 in nut 59 there is no contact therebetween and, as said pin is either insulated from electrode 60 or made of insulating material, the sole current path between the upper and lower electrodes is through the body of nut 59, the welding projections 59a, and the support member 57. With this arrangement there is no possibility of burning or arcing between the pilot and either the wall of the hole in the weld nut or the wall of the hole in the support member as the pilot is completely out of engagement with both the nut and the support member during welding.

From the above description it will be seen that my improved welding electrode permits rapid and accurate alignment of a weld with a hole in the member to which the nut is to be attached, possesses very long life, eliminates the possibility of burning or welding of the electrode pilot at the opening in the support member, greatly reduces wear of either metal or insulating material pilots and enables the electrode readily to be adapted to various sizes of weld nuts and various thicknesses of support members. Although I have described the illustrated embodiments of my invention in considerable detail it will be understood that various modifications may be made in the specific form of the electrodes, pilots, etc., without departing from the spirit of my invention and I do not, therefore, wish to be limited to the particular devices shown herein and described but claim as my invention all embodiments thereof coming within the scope of the appended claims.

I claim:

1. In welding apparatus for indexing and welding a weld nut or the like on a support member, an electrode having a body portion having an end contact face and a bore extending into said body portion from said end contact face, a pilot member slidably supported for lonigtudinal movement in said bore, means for urging said pilot member outwardly of said bore, and stop means for limiting the outward movement of said pilot member, said pilot member having an index portion having an end face disposed beyond said contact face of said electrode when said pilot member is held against further outward movemnt by said stop means, and means for moving said end face inwardly to a point below said contact face.

2. In welding apparatus for indexing and welding a weld nut or the like on a support member, an electrode having a body portion, said body portion having an end contact face and a bore extending thereinto from said end contact face, a pilot member slidably supported for longitudinal movement in said bore, means for urging said pilot member outwardly of said bore, stop means for limiting the outward movement of said pilot member, said pilot having an index portion having an end face disposed beyond said contact face of said electrode when said pilot member is held against further outward movement by said stop means, and a second electrode having an end contact face disposed in opposed relation to said end contact face of said first named electrode, said electrodes being supported for movement of said end contact faces thereof toward and away from each other, said second named electrode having a portion adapted to engage said index portion of said pilot member when said electrodes are moved toward each other and move said pilot member inwardly in said bore of said first named electrode.

3. In welding apparatus for indexing and welding a weld nut or the like on a support member, an electrode having a body portion, said body portion having an end contact face and a bore extending thereinto from said end contact face, a pilot member slidably supported for longitudinal movement in said bore, means for urging said pilot member outwardly of said bore, stop means for limiting the outward movement of said pilot member, said pilot having an index portion having an end face disposed beyond said contact face of said electrode when said pilot member is held against further outward movement by said stop means, and a second electrode having an end contact face disposed in opposed relation to said end contact face of said first named electrode, said electrodes being supported for movement of said end contact faces thereof toward and away from each other, said second named electrode having a portion electrically insulated therefrom and adapted to engage said index portion of said pilot member when said electrodes are moved toward each other and move said pilot member inwardly in said bore of said first named electrode.

4. In a welding electrode for indexing and welding a weld nut or the like on a support member, a body portion having an end contact face and a bore extending into said body portion from said end contact face, a pilot member slidably supported for longitudinal movement in said bore, means for urging said pilot member outwardly of said bore, and stop means for limiting the outward movement of said pilot member, said pilot member having a primary index portion having an end face disposed beyond said contact face of said electrode when said pilot member is held against further outward movement by said said stop means, and said pilot member also having a secondary index portion of smaller diameter than said primary index portion and projecting outwardly therefrom a distance greater than the overall thickness of the weld nut with which said electrode is to be used.

5. In a welding electrode for indexing and welding weld nuts on a support member, a main body portion having an end contact face and a cylindrical bore extending into said body portion substantially normal to said end contact face, a pilot member slidably disposed in said bore and having a primary index portion of substantially the same diameter as said bore, stop means for limiting the outward movement of said pilot member in said bore, means for urging said pilot member outwardly of said bore, said pilot member also having a secondary index portion of smaller diameter than said primary index portion and coaxially disposed relative thereto, said secondary index portion extending outwardly from the outer end of said primary index portion a distance greater than the overall thickness of the weld nut with which said electrode is to be used.

6. In a welding electrode for indexing and welding a weld nut or the like on a support member, a body portion having an end contact face and a bore extending into said body portion from said end contact face, a pilot member slidably supported for longitudinal movement in said bore, means for urging said pilot member out of said bore, and stop means for limiting the outward movement of said pilot member, said pilot member having a primary index portion having an end face disposed beyond said contact face of said body portion when said pilot member is held against further outward movement by said stop means, said pilot member also having a secondary index portion of smaller diameter than said primary index portion and projecting outwardly from said end face thereof, said secondary index portion having a length such that it projects beyond the outer face of a weld nut, disposed thereon in position for welding, a distance greater than the distance said end face of said primary index member is disposed beyond said contact face.

7. In a welding electrode for indexing a weld nut having an aperture therethrough on a support member having a corresponding aperture therethrough with said apertures in substantial alignment, a metal body portion having an end contact face adapted to engage said support member and a bore extending into said body portion from said end contact face, a pilot member slidably mounted in said bore, means for urging said pilot member outwardly of said bore, and stop means for limiting the outward movement of said pilot member in said bore, said pilot member having a primary index portion extending beyond said contact face of said body portion when said pilot member is held by said stop means against further outward movement and a secondary index portion projecting from said primary index portion a distance greater than the overall thickness of the weld nut with which said electrode is to be used, said secondary index portion being of smaller transverse dimension than said primary index portion whereby said secondary index portion is out of contact with the wall of said bore at all times.

8. A welding electrode for indexing a weld nut having an aperture therethrough on a support member having a corresponding aperture therethrough with said apertures in substantial alignment comprising, a metal body portion having an end contact face adapted to engage said support member and a bore extending into said body portion from said end contact face, a pilot member slidably mounted in said bore, said pilot member having a base portion at the inner end thereof, a primary index portion, and a portion of reduced diameter between said base portion and primary index portion, a stop pin removably supported in said body portion of said electrode and extending into said bore between said base portion and said primary index portion of said pilot member and adapted to engage said base portion and limit outward movement of said pilot member, spring means in said bore effective against said base portion for urging said pilot member outwardly into stopping engagement with said stop member, said primary index portion having its outer end adapted to fit and index said aperture in said support member, and a secondary index portion extending outwardly from said primary index portion and of smaller diameter than said primary index portion, said base portion, reduced diameter portion, primary index portion and secondary index portion of said pilot member being concentrically disposed relative to the longitudinal axis of said pilot member.

9. In apparatus for indexing a weld nut having an aperture therethrough on a support member having a corresponding aperture therethrough with said apetrures in substantial alignment and welding said nut to said support member, an electrode having a metal body portion having an end contact face adapted to engage said support member and a bore extending into said body portion from said end contact face, a pilot member slidably mounted in said bore, said pilot member having a base portion at the inner end thereof, a primary index portion, and a portion of reduced diameter between said base portion and primary index portion, a stop pin removably supported in said body portion of said electrode and extending into said bore between said base portion and said primary index portion of said pilot member and adapted to engage said base portion and limit outward movement of said pilot member, spring means in said bore effective against said base portion for urging said pilot member outwardly into stopping engagement with said stop member, said primary index portion having its outer end adapted to fit and index said aperture in said support member, a secondary index portion extending outwardly from said primary index portion and of smaller diameter than said primary index portion, said base portion, reduced diameter portion, primary index portion and secondary index portion of said pilot member being concentrically disposed relative to the longitudinal axis of said pilot member, and a second electrode having an end contact face, said electrodes being supported in opposed spaced-apart relation and being movable toward and away from each other, said second electrode having a portion adapted to engage said secondary index portion of said pilot member and move said outer end of said primary index portion into said bore.

10. Welding apparatus including a welding electrode for indexing a weld nut having an aperture therethrough on a support member having a corresponding aperture therethrough with said apertures in substantial alignment, said electrode having a metal body portion having an end contact face adapted to engage said support member and a bore extending into said body portion from said end contact face, a pilot member slidably mounted in said bore, means for resiliently holding the outer end of said pilot member beyond said contact face of said body portion, and means for moving said pilot member inwardly in said bore to a point below said end contact face.

11. In welding apparatus for indexing and welding a weld nut or the like on a support member, an electrode having a main body portion, a detachable end portion, means for removably securing said end portion to said main body portion, said end portion having a bore extending longitudinally therethrough, a pilot member slidably supported for longitudinal movement in said bore, spring means for urging said pilot member outwardly of said bore, and cooperating stop means on said pilot member and said detachable end portion for limiting outward movement of said pilot member in said bore, and a second electrode having a portion adapted to engage said pilot member when said electrodes are moved toward each other with a weld nut in position on said pilot member and to move said pilot member inwardly in said bore without moving said nut.

12. A welding electrode for indexing and welding a weld nut or the like on a support member comprising, a main body portion, a detachable end portion, means for removably securing said end portion to said main body portion, said end portion having a bore extending longitudinally therethrough, a pilot member slidably supported for longitudinal movement in said bore, spring means for urging said pilot member outwardly of said bore, and cooperating stop means on said pilot member and said detachable end portion for limiting outward movement of said pilot member in said bore, said spring means having engagement at one end with the inner end of said pilot member and at its other end with a part of said main body portion of said electrode.

13. In a welding electrode for indexing and welding a weld nut or the like on a support member, a base unit, a detachable electrode insert, means for removably securing said insert to said base unit, said insert having a bore extending longitudinally therethrough, a pilot member slidably suported for longitudinal movement in said bore, spring means for urging said pilot member outwardly of said bore, an enlarged stop flange removably mounted on the inner end of said pilot member, said insert being recessed to accommodate said flange and limit outward movement of said pilot member in said bore, said spring means having engagement at one end with a portion of said pilot member and at its opposite end with a portion of said insert.

14. In apparatus for indexing a weld nut having an aperture therethrough on a support member having a corresponding aperture therethrough with said apertures in substantial alignment and welding said nut to said support member, an electrode having a metal body portion having an end contact face adapted to engage said support member and a bore extending into said body portion from said end contact face, a pilot member slidably mounted in said bore, said pilot member having a primary index portion having its outer end adapted to fit and index said aperture in said support member, a secondary index portion extending outwardly from said primary index portion and of smaller diameter than said primary index portion, stop means for limiting the outward movement of said pilot member in said bore with said primary index portion projecting beyond said end contact face of said electrode, means for resiliently urging said pilot member outwardly of said bore, and a second electrode having an end contact face, said electrodes being supported in opposed spaced-apart relation and being movable toward and away from each other, said second electrode having a portion adapted to engage said secondary index portion of said pilot member and move said outer end of said primary index portion into said bore.

References Cited in the file of this patent

UNITED STATES PATENTS 2,623,974     Prucha _____ Dec. 30, 1952